(12) United States Patent
Richter et al.

(10) Patent No.: US 7,960,650 B2
(45) Date of Patent: Jun. 14, 2011

(54) CONNECTION BOX FOR SOLAR PANEL

(75) Inventors: Michael Richter, Schalksmuehle (DE);
Stefan Joergens, Schalksmuehle (DE);
Lothar Fuhrmeister, Schalksmuehle (DE)

(73) Assignee: Lumberg Connect GmbH, Schalksmuehle (DE)

( * ) Notice: Subject to any disclaimer, the term of this patent is extended or adjusted under 35 U.S.C. 154(b) by 150 days.

(21) Appl. No.: 12/434,734

(22) Filed: May 4, 2009

(65) Prior Publication Data
US 2009/0272574 A1    Nov. 5, 2009

(30) Foreign Application Priority Data
May 3, 2008  (DE) ......................... 10 2008 022 049

(51) Int. Cl.
*H02G 3/08* (2006.01)

(52) U.S. Cl. .............. 174/50; 174/58; 174/64; 136/244; 439/718; 439/142

(58) Field of Classification Search ..................... 174/50, 174/58, 64; 136/244, 245, 246, 251; 439/135, 439/136, 142, 571, 786, 796, 852, 709; 220/4.02
See application file for complete search history.

(56) References Cited

U.S. PATENT DOCUMENTS

| 7,097,516 | B2 * | 8/2006 | Werner et al. | ................. 439/709 |
| 7,291,036 | B1 | 11/2007 | Baily | ............................ 439/487 |
| 7,444,743 | B2 | 11/2008 | Feldmeier et al. | ............. 29/748 |
| 7,763,807 | B2 * | 7/2010 | Richter | ...................... 174/138 F |
| 2005/0230140 | A1 | 10/2005 | Higashikozono | ............... 174/59 |

FOREIGN PATENT DOCUMENTS

| DE | 202005018884 | 3/2006 |
| DE | 102005008123 | 9/2006 |

* cited by examiner

*Primary Examiner* — Dhiru R Patel
(74) *Attorney, Agent, or Firm* — Andrew Wilford

(57) ABSTRACT

A box for connecting an output conductor from a solar panel with a feed cable has a base mountable on the solar panel and formed with a first hole for the panel-output conductor and a second hole for the feed cable, a removable cover fittable with the base in a closed position and forming in the closed position with the base a substantially closed compartment, and at least one component mounted on the cover in the compartment. The component is something that affects transmission of electricity from the solar panel into an electrical network connected to the feed cable or that affects the microclimate inside the connection box.

12 Claims, 5 Drawing Sheets

CONNECTION BOX FOR SOLAR PANEL

FIELD OF THE INVENTION

The present invention relates to a connection box. More particularly this invention concerns a connection box for a solar panel.

BACKGROUND OF THE INVENTION

A typical the connection box, in particular for solar panels, comprises a cover that upwardly closes a base that is itself attached to the back of a solar panel. The base has a first opening for at least one output conductor or cable from the panel and at least one opening for a feed cable exiting from the panel and going to the network using the solar-generated electricity. The base also has a compartment that holds circuit elements for connecting the panel-output cable to the feed cable.

A the connection box of this type is disclosed, for example, in 10 2005 008 123 A1. the base of the connection box here has a strip-conductor structure that is provided with cable clamps. The cable clamps function to connect the feed cables and the panel-output cables to the strip-conductor structure.

In US 2005/0230140 screw-type terminals are provided to which the panel-output cables and the feed cables are electrically connected by strip-conductor structures.

U.S. Pat. No. 7,444,743 discloses a strip-conductor structure inside a connection box in which the feed cables and panel-output cables are connected by crimping to the strip-conductor structure. For bridge diodes, the strip-conductor structure forms forked-spring-contact-type contact clips.

DE 20 2005 018 884 describes a connection box whose opposite side walls has holes through which panel-associated panel-output cables and the feed cables are routed into the connection box. Bridge-like clamping components are placed between the cables to be connected and are analogous to the strip-conductor structures. At their ends, these clamping components have clamp springs to make the contact of the cables and provided with contact openings in which the bridge diodes can be inserted.

The above-described the connection boxes have various circuit elements depending on the application they are put to, with the result that a different the connection box essentially exists for each application in terms of constructive design and size as well as the mounting of circuit elements.

The circuit elements used within the scope of the invention are defined as elements that have an effect on the transmission of electricity from the solar panel into the electrical network, or affect the microclimate exiting inside the connection box. Explicitly not circuit elements are seals between the cover and the base of the connection box. These do not have any effect on the transmission of electricity and also have little effect on the microclimate existing in the connection box. Instead, it is in fact such seals that create a microclimate in the the connection box.

Thus in the prior art there are two different possible approaches for sealing the base, in particular, sealing the compartment containing the circuit elements. In a first approach, provision is made whereby after installation of the box on the solar panel, and the panel-output cable and the feed cable, the compartment is sealed with a resin. This enables the circuit elements inside the compartment to be reliably protected against moisture and contamination.

A second solution provides an annular seal between the cover and the base of the connection box, the seal similarly forming a compartment inside the connection box that is protected against contamination and moisture.

A change in the connection equipment on the part of the manufacturer of the solar panel usually necessitates the use of a new connection box, and thus a modification of production to match this new box. A change in terms of sealing the connection box also involves the same effort/expense.

On the part of the manufacturer of the connection boxes, such a change requires the development of a new connection box and thus a changeover of the manufacturer's production process.

OBJECTS OF THE INVENTION

It is therefore an object of the present invention to provide an improved solar-panel connection box.

Another object is the provision of such an improved solar-panel connection box that overcomes the above-given disadvantages, in particular that reduces the number of the various connection boxes, in particular, of the various bases of the connection boxes despite the variation in requirements.

SUMMARY OF THE INVENTION

A box for connecting an output conductor from a solar panel with a feed cable has according to the invention a base mountable on the solar panel and formed with a first hole for the panel-output conductor and a second hole for the feed cable, a removable cover fittable with the base in a closed position and forming in the closed position with the base a substantially closed compartment, and at least one component mounted on the cover in the compartment.

A component within the scope of the invention is something that affects transmission of electricity from the solar panel into an electrical network connected to the feed cable, in particular, a connector for electrically connecting the panel-output cable and the feed cable. This can be a contact, a conductive track, a lead frame, an element bridging two the panel-output cables such as a diode, or an active or passive switching or control element.

In addition a component within the scope of the invention is something that affects the microclimate inside the connection box, in particular a heat-emitting element, a cooling plate, or a gas-exchange element, in particular, a gas-permeable membrane or sintered metal part or plug.

Using the cover closing the base as a mount for such a component can help in reducing the multiplicity of different bases for the connection boxes. The following example is provided to explain circuit elements that affect the transmission of electricity:

Prior-art connection boxes are known that couple multiple panel-output cables to at least two the feed cables. In these multipolar connection boxes, the typical approach is to bridge the individual panel-output cables relative to each other by diodes so as to ensure the flow of electrical current from the feed cable in the event of a failure or when the solar cells are shaded. However, multipolar connection boxes are certainly known in which shunt diodes are not used. As a result, connectors that affect an electrical connection with shunt diodes are missing in these the connection boxes.

If the manufacturer of solar panels using shunt-free connection boxes wants to change over to connection boxes in which shunt diodes can be employed, it has been necessary up to now to install appropriate connectors in the base. Thus according to the invention the cover used for the shunt-diode-free connection box carries the shunt diodes, so this installation step can be eliminated.

The advantages of the invention in regard to circuit elements that affect the climate inside the connection box can be described based on the following example:

As was already explained above, there are two different techniques that protect the circuit elements inside the box from damaging environmental effects such as contamination and moisture. Encapsulating the circuit elements inserted in the compartment has the fundamental advantage that the seal can be reliably ensured using simple means. The fundamental disadvantage of this technique is that no corrective action can be taken on the circuit elements after the fact since these are solidly encapsulated by resin. Replacement of a defective diode or fixing a poorly contacting connection between the panel-output cable and the feed cable is not possible without destroying the connection box.

Connection boxes, whose compartment is protected against environmental effects by a flexible seal between the cover and the base do not have these disadvantages. However, since an air cavity does exist inside the box, a microclimate forms in the box as a function of the outside climate, with the result that condensation or the formation of positive or negative pressures can occur inside the box. These boxes must therefore be provided with a gas-permeable element, such as, for example, a membrane or a sintered-metal wall plug.

In particular when changing over from the encapsulation technique to a box with an unsealed compartment, up until now it was necessary to switch to a base with a gas-exchange element, which action usually involved a changeover in fabrication due to modified box dimensions. The cover according to the invention, which based on the above-referenced embodiment can contain a gas-exchange element, enables the previously employed box to be reused without changing over the fabrication process in terms of the design of the connection box.

Another embodiment of the invention is characterized in that the above-mentioned cooling plate has thermal bridges that engage heat-emitting components inside the compartment. In particular, these thermal bridges are designed as elastic spring tongues. These thermal bridges are integral with the cooling plate.

Providing the cover with a cooling plate to dissipate heat generated inside the connection box creates another problem that occurs in the prior art. Heat is emitted in currently used embodiments of the connection boxes, in particular, by shunt diodes, which in operation can reach a temperature of up to 180° C. This heat negatively affects the solar cells of the solar panel. A cover provided with a cooling plate, in particular, as specified by the above-referenced design variants, makes it possible to easily yet effectively retrofit existing connection boxes in order to solve the temperature problem.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
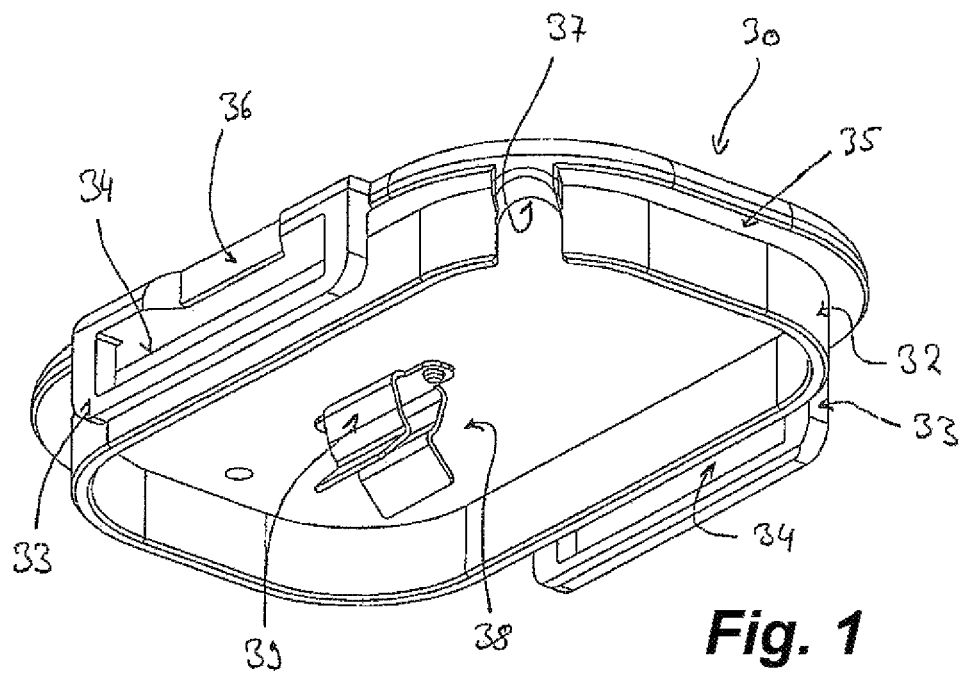
FIG. 1 is a perspective view from below of the cover of the box according to the invention.
Figure 2:
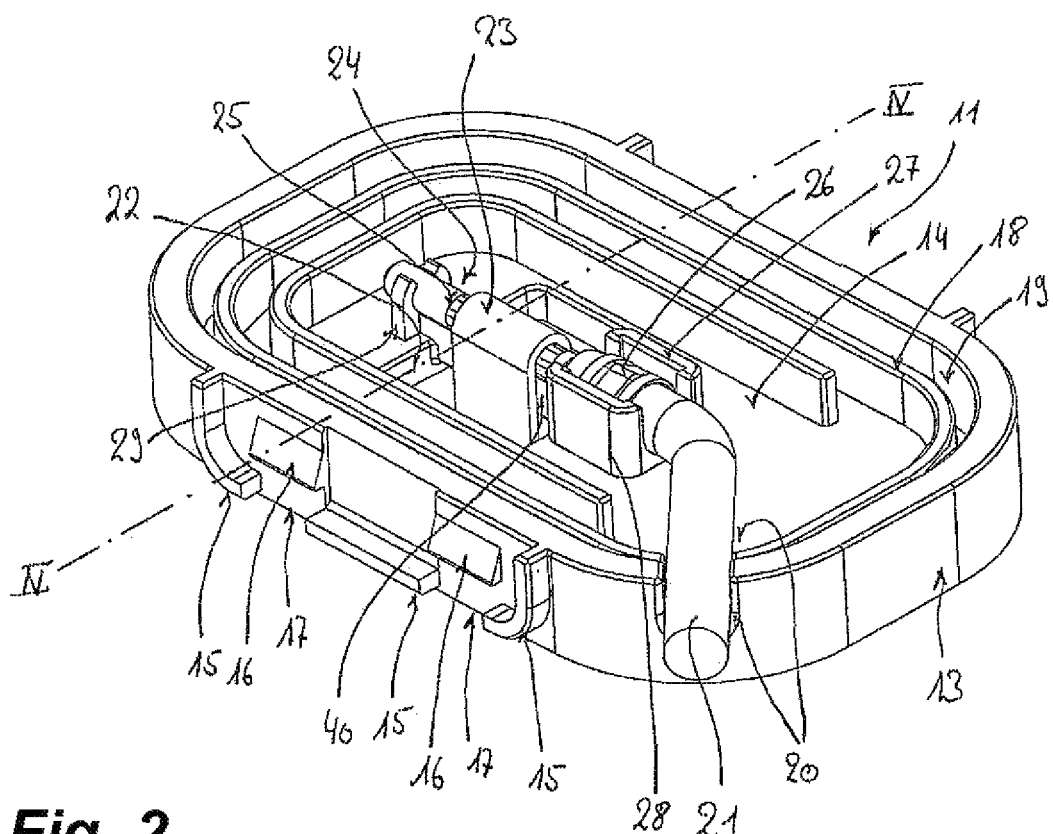
FIG. 2 is a perspective view from above of the base of the box.

As seen in FIGS. 1 and 2 a connection box 10 according to the invention has a base 11 (FIG. 2) with a generally rectangular and planar floor 12 and an annular side wall 13 that define a compartment 14 serving to hold circuit elements. On two opposing sides at its outer surface, the side wall 13 is provided with guides 15 and projecting locking lugs 16. Below the locking lugs 16, the guides 15 have tool-guide slots 17. (The references to "up" and "down" are purely for convenience of description, since the box is often mounted inverted on the generally downwardly facing back face of a solar panel shown schematically in FIG. 4 at 68.)

An inner wall 18 parallel to the outer side wall 13 is provided inside the compartment 14 such that it is spaced relative to side wall 13 by a circumferential gap 19 from the wall 13. The side wall 13 and inner wall 18 each have aligned cable guide cutouts or holes 20 through which a feed cable 21 passes. The feed cable 21 conducts the electricity generated by the solar panel 68 into an electricity network, optionally through additional technical equipment.

The floor 12 of the base 11 has a hole or opening 22 through which panel-output cables 23 are routed into compartment 14 of connection box 10. These panel-output cables 23 are strip conductors whereas the feed cable 21 is a standard cable with conductors held in an outer insulating sheath.

The feed cable 21 has a stripped end 24 where its conductors are mechanically reinforced by a cable end sleeve 25. A crimp ring 26 inward therefrom in the end 24 functions as part of a strain-relief assembly. The floor 12 of the connection box 10 has two approximately U-shaped ridges 27 extending perpendicular upward from the floor 12. These ridges 27 form a holding seat 28 that is centrally grooved. This groove receives the crimp ring 26 to take up strain in the feed cable 21.

The end 24 provided with the cable end sleeve 25 of the feed cable 21 extends across the opening 22 of the floor 12 and is anchored at least on the opposite side in the compartment 28 of the opening 22. To this end, two U-forming lugs 29 on the floor 12 form a snap-in support for the cable end sleeve 25. In this case, the cable end sleeve 25 also rests on a support ridge 40 extending across the opening 22.

The panel-output cable 23 coming from the solar panel passes through the opening 22 into the connection box 10 and over the end 24 of feed cable 21 such that it is partially wrapped around the cable 11 end sleeve 25 in electrical contact therewith.

The floor 12 of the base 11 of the connection box 10 is secured by its face turned away from the cover 30 to the solar panel shown schematically at 68, in particular, by an adhesive bond 69. The opening 22 is in the region of a cutout in the solar-panel housing through which panel-output cables 23 are routed to the outside.

A cover 30 the of connection box 10 is illustrated in FIG. 1. It has a planar top wall 31 normally extending parallel to but space from the floor 12 and provided with an essentially circumferential collar 32 directed toward the base 11.

At opposite sides, locking lugs 33 facing the base 11 project from the cover 30 and each define a snap-in-locking opening 34. A circumferential overhanging rim 35 projecting from the cover wall 31 opposite the collar 32 is formed near the locking lugs by a tool-engagement formation 36. Similarly, the collar 32 has a cable guide cutout 37. This corresponds in terms of its position with cable guide cutouts 20 of the inner and outer side walls 13 and 18.

The bottom face of the cover wall 31 facing the base 11 is provided with a contact 38 in the form of a clip spring 39 having an approximately Ω-shaped cross-section.

When the box 10 is closed, that is, when cover 30 is mounted on the base 11, the collar 32 fits in the base-section-associated ring gap 19. To effect a gas-tight seal of connection box 10, a seal (not shown), is provided. The lug guides 15 receive the locking lugs 33 that are pushed over the wedge-shaped locking lugs 16 and grasp these from behind while locking the connection box 10 closed. The cable end sleeve 25 overlaps the clamping springs 39, which engage in the overlap region of the panel-output cable 23 and the end 24 of the feed cable 21, and are provided on the cover wall 31, when everything is closed. This ensures that panel-output cable 23 is held in a securely clamped fashion on the cable end sleeve 25.

The tool-engagement formations 17 and 36 function to allow spreading and release of the snap-in-locking connection between the locking lugs 33 and locking lugs 16, so as to allow the cover to be removed from base 11.

Figure 4:
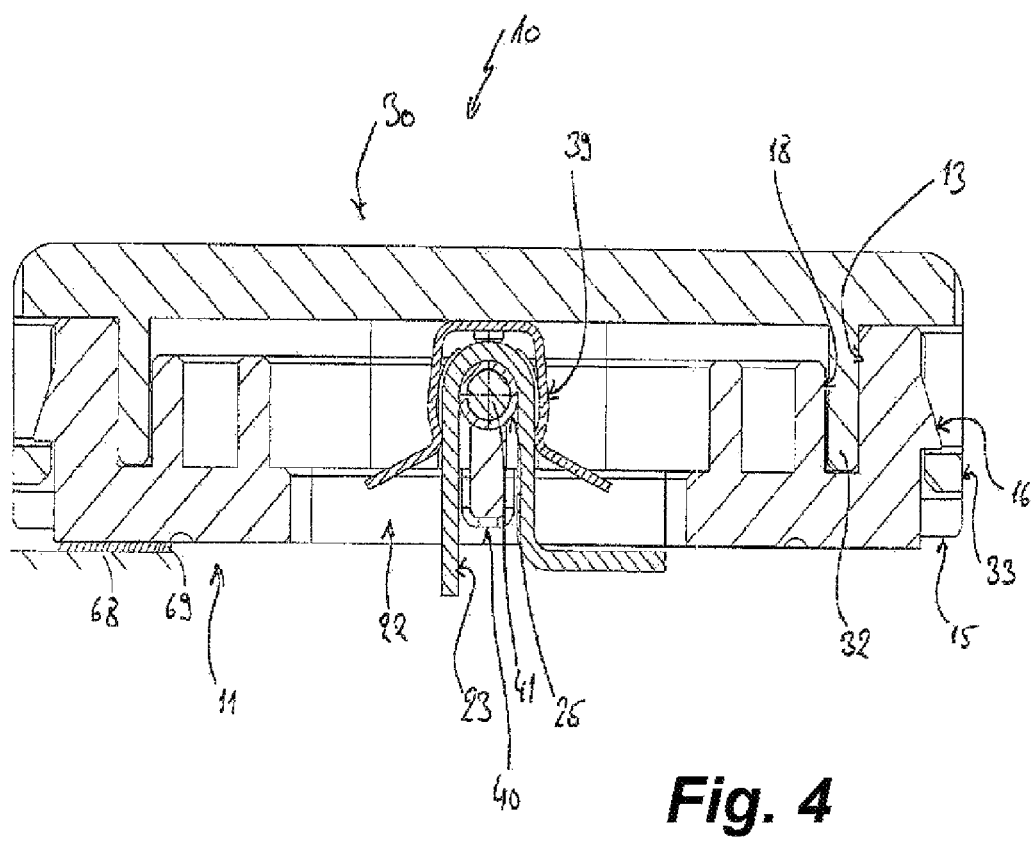
FIG. 4 is a section taken along line IV-IV of FIG. 2.

FIG. 4 shows on the right the snap-in-locking connection between the cover 30 and the base 11 by the locking lugs 33 grasping behind the locking lugs 16. Also shown is the insertion of the collar 32 in the annular gap 19 is formed between the inner side wall 18 and the outer side wall 13. The cable end sleeve 25 surrounds the core 41 composed of multiple conductors in the illustrated embodiment and mechanically reinforces this core 41. The panel-output cable 23 exiting the solar panel passes around the cable end sleeve 25. This cable end sleeve 25 itself rests on a lower support ridge 40 bridging the opening 22. The spring 39 grips the panel-output cable 23 on the cable end sleeve 25, and holds the panel-output cable 23 on the cable end sleeve 25 securely so as to form a good electrical connection.

FIG. 4 clearly shows that only the cable end sleeve 25 of the contact 39 functions as a support. The spring 39, panel-output cable 23, and cable end sleeve 28 consequently form a self-supporting connection arrangement.

It is within the scope of the invention that the clip 38 can be mounted detachably on the panel-output cable 23 and cable end sleeve 25.

In sum, a connection box 10 has been described that advantageously provides an installation-friendly, secure electrical connection between the panel-output cable 23 and the feed cable 21. The need for tool to work on conductor elements and strip-conductor structures inside the connection box has been eliminated. The simple arrangement of the panel-output cable 23 directly on an electrically conductive region of the feed cable 21 and the secure connection by a contact that only needs to be fitted in place have significant time and cost advantages for installing the connection box, in particular, if the clip 38 is mounted on the cover 30 of box 10 and the connection between panel-output cable 23 and feed cable 21 are locked together by closing the box 10.

Figure 3:
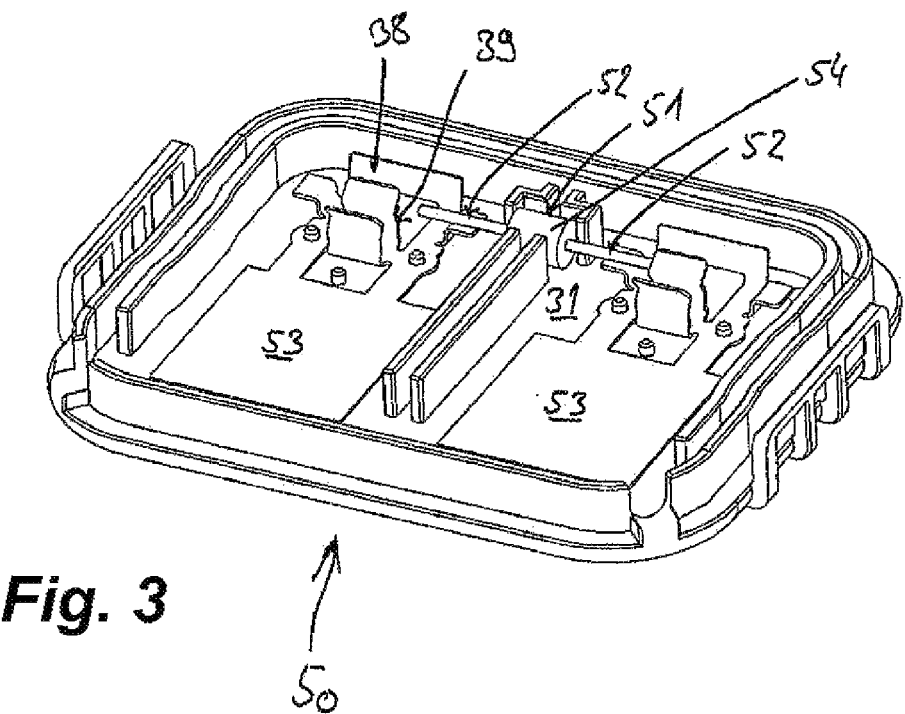
FIG. 3 is a view from above of an inverted alternate cover in accordance with the invention.

FIG. 3 shows a cover 50 of another embodiment of the invention that corresponds with another unillustrated base. The connection box 10, not shown in its entirety, of this second embodiment is of multipolar design. This means that multiple panel-output cables 23 exiting the solar panel are connected to two feed cables 21 inserted into the connection box 10. In this case, this involves a two-pole connection box 10 in which, analogously to the previous description, one panel-output cable 23 is fitted on each electrically conductive and mechanically reinforced end 24 of a respective feed cable 21. Contacts 38 provided in the cover 50, which here too are designed as clamping springs 39 with an approximately Ω-shaped cross-section, ensure the good electrical connection of the panel-output cables 23 and the ends 24 of the respective feed cables 21.

In the case of multipole connection boxes 10, panel-output cables 23 are typically provided with shunt diodes 51. These prevent the solar panel from heating up, whenever solar cells are not operating in the case of parallel operation, for example, due to shading, by preventing undesired current from flowing.

Unlike the prior art referenced in the introduction, the shunt diodes are not inserted in the base using connection clamping terminals, but are instead integrated in the cover 50 and electrically connected to clamping springs 39 through their leads 52.

Since shunt diodes 51 in current applications are the main cause of waste heat, the arrangement of the shunt diode in the cover has significant advantages in thermal terms alone. The diode is thus disposed directly adjacent the usually well-ventilated end wall 31 of the cover 50 such that the waste heat can be effectively dissipated. Dissipation of the waste heat can also be significantly improved further by disposing large-area heat-sink plates, or at least one heat-conducting plate 53 on the bottom side of cover wall 31. These cooling plates—also identified as heat sinks—are connected through thermal bridges in this example leads 52, to the body 54 of the diode 51, thereby further improving heat dissipation.

In one development, not illustrated here, the diode body 54 rests directly on the cooling plate 53, diode body 54 then preferably providing as large a support area as possible.

In sum, FIG. 3 illustrates an extremely advantageous development of the invention by which problems caused by waste heat from circuit elements supported inside the connection box 10 can be eliminated.

The above-referenced connection box involves a new development various circuit element have been eliminated from the base. Except for the feed cable 21 attached inside the base 11 and the panel-output cable 23, the base 11 does not contain any other component. The purpose of compartment 14 is to accommodate the circuit elements disposed on the cover 30.

In contrast, FIGS. 5 through 8 show a connection box 10 as essentially known from prior art, the base 11 of which contains various circuit elements.

Figure 5:
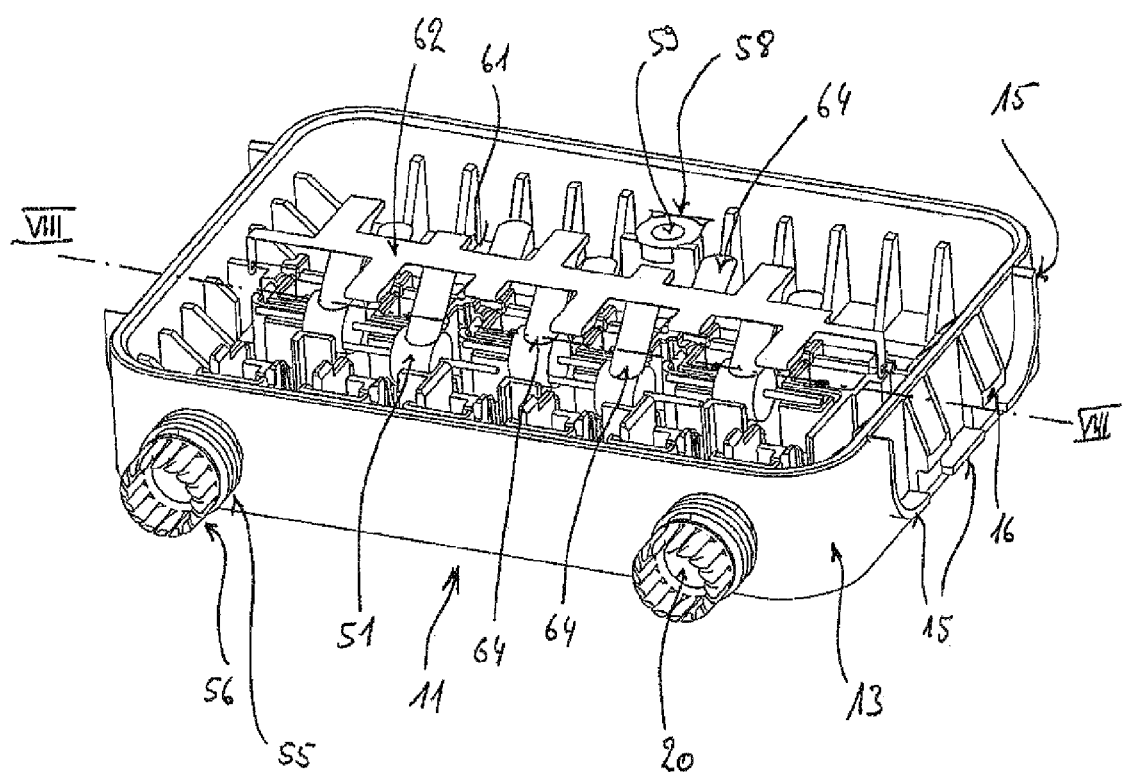
FIG. 5 is a perspective view from above of a base of an alternative embodiment of the connection box.

The base 11 shown in FIG. 5 has threaded collars 55 surrounding cable guide cutouts, the collars having pinch-type tongues 56 pointing away from the connection box 10, through which the feed cables 21, not shown, are routed. After insertion of the feed cables 21 through the cable guide cutouts 20, acorn nuts, not shown here, that grasp the tongues 56 are screwed onto the threaded collars 55, the acorn nuts pressing the tongues 56 into the insulating sheath of the feed cable 21 and having a strain-relief effect.

The connection box 10 shown in FIGS. 5 through 8 is a multipolar connection box 10. This means that a plurality of panel-output cables 23 are inserted into the compartment 14 and electrically connected with respective strip-conductor structures, not shown here. The individual the panel-output cables 23 are coupled to each other through shunt diodes 51.

Figure 6:
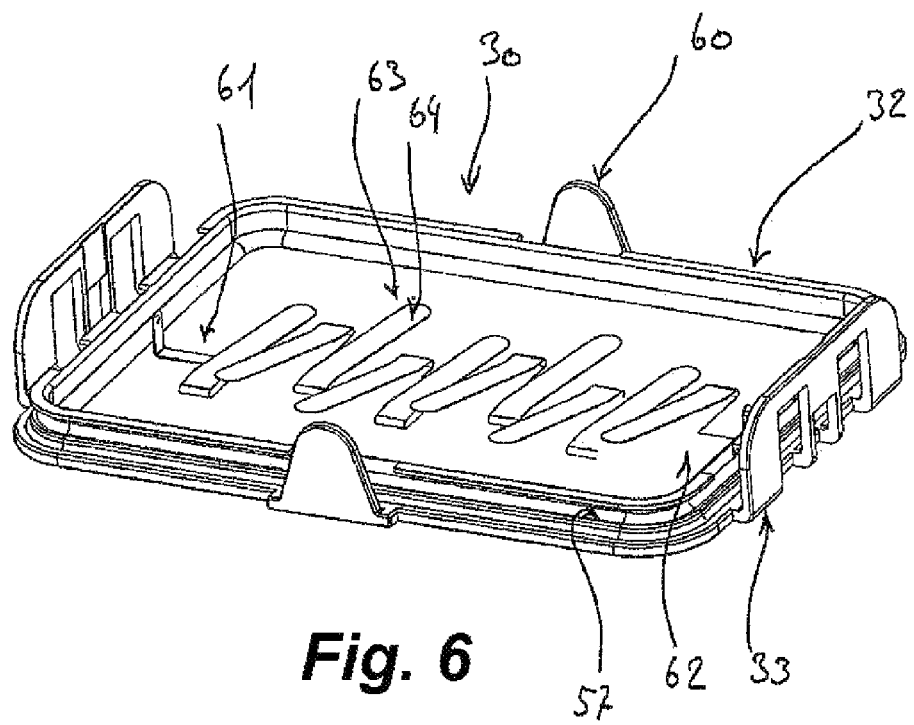
FIG. 6 is a perspective view from above of an inverted cover for the base of FIG. 5.
Figure 7:
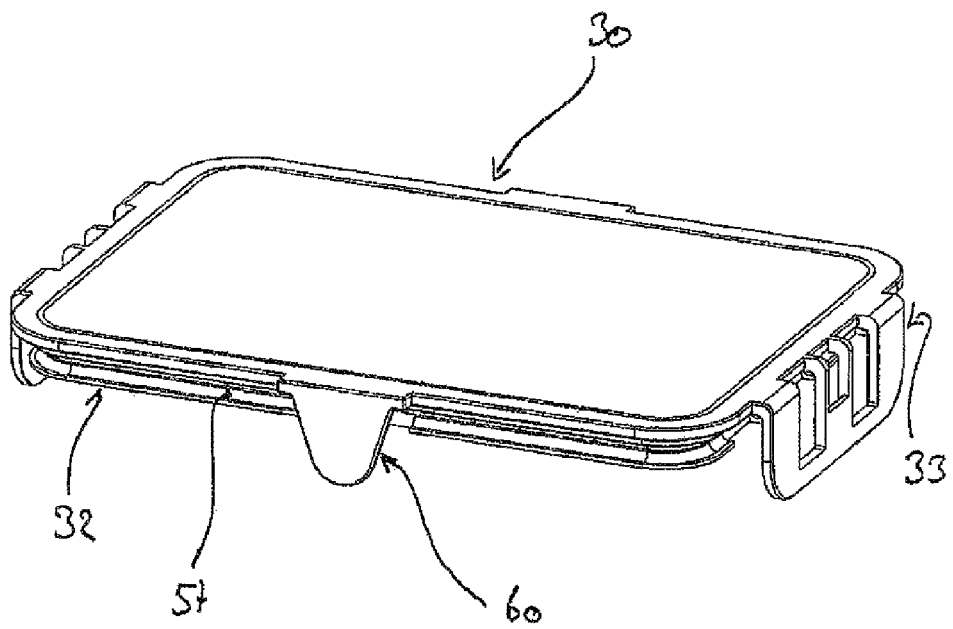
FIG. 7 is a perspective view from above of the cover of FIG. 6 in its normal orientation.
Figure 8:
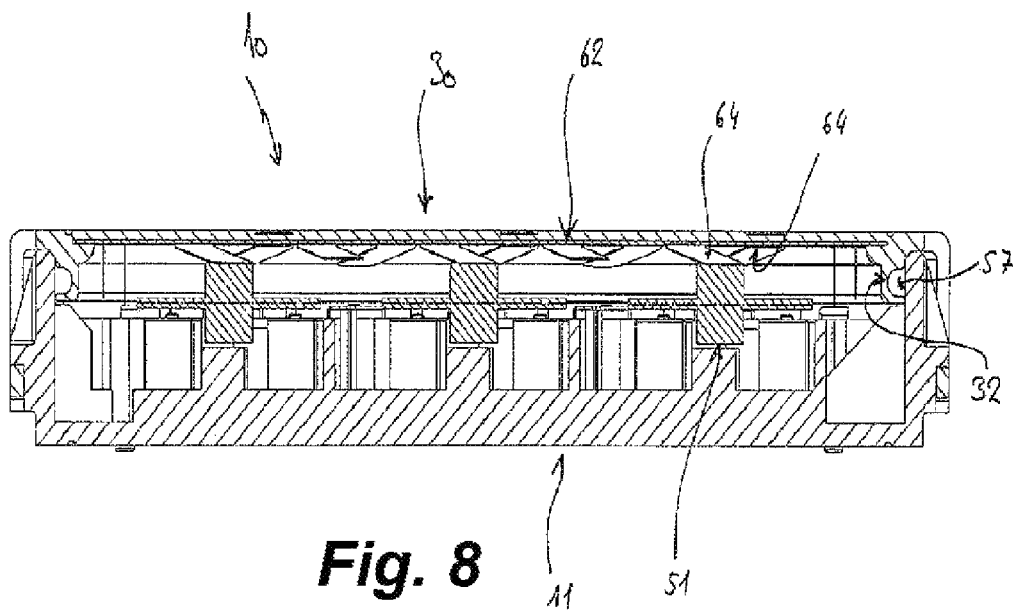
FIG. 8 is a longitudinal section through a connection box taken along line VIII-VIII in FIG. 5.

The cover associated with the base in FIG. 5 is shown in a perspective view from below and above in FIGS. 6 and 7. The collar 32 here has an outwardly open circumferential groove 57 into which an unillustrated seal such as an O-ring is inserted. When the cover 30 is mounted on the base 11, this O-ring seals the cover 30 and the base 11 against each other, thereby creating a sealed air cavity inside the closed connection box 10.

In order to equalize pressure between the outer climate and the microclimate inside the connection box, the base 11 in FIG. 5 has a gas-exchange element identified as 58 in the form of a sintered metal plug 59. The plug 59 is fitted in openings in the side wall 13 and exposed to the outer environment. When the connection box 10 is closed, tabs 60 of the cover 30 overlay these openings in the side wall 13 to prevent contamination of them. In this embodiment, the cover has two opposite tabs 60. Hence care must be taken with the appropriate alignment of the cover 30 when the connection box 10 is closed.

The connection box 10 shown in FIGS. 5 through 8 has a special feature in regard to the cover. A heat-dissipating element 61 in the form of a cooling plate 62 (see FIG. 6) is provided on the bottom of the cover 30, this element being shown in FIG. 5 in the position it assumes when the connection box 10 is closed.

The cooling plate 62 receives heat from the shunt diodes 51 through thermal bridges 63 that are designed as elastic spring tongues 64, the heat typically being carried away by the radiation or conduction from externally well ventilated cover 30. The shunt diodes 51 here represent any conceivable heat-emitting circuit element.

In addition to the sintered metal vent plugs, the cooling plate constitutes a second circuit element that affects the microclimate inside the connection box 10. It is possible to eliminate temperature problems in existing connection boxes by the cover 30 as described here and carrying a circuit element and a cooling plate 62

Figure 9:
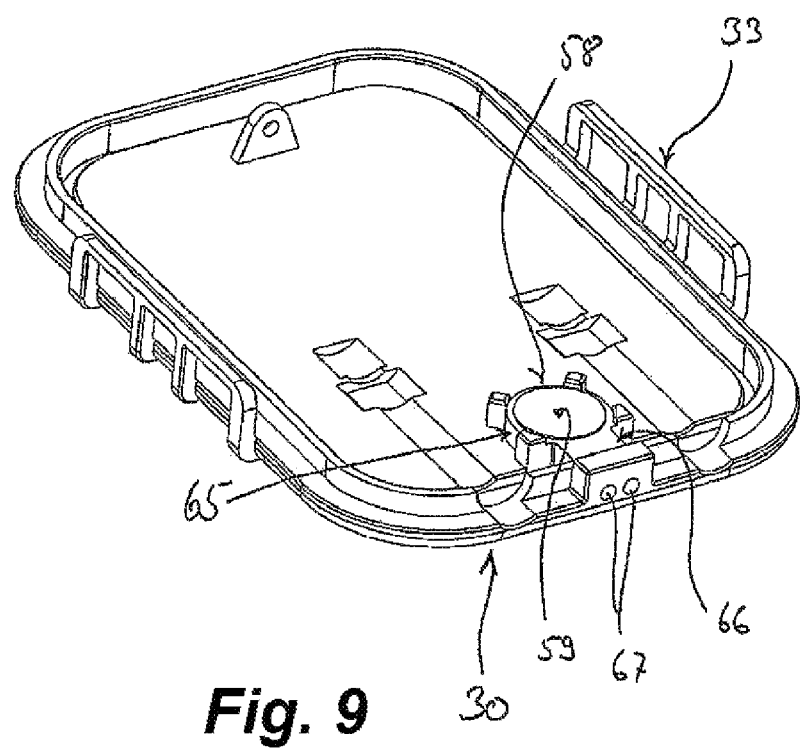
FIG. 9 is a perspective view of a cover of another embodiment of a connection box according to the invention.

FIG. 9 shows another embodiment of the invention. Here again a cover 30 carries a circuit element in the form of a gas-exchange element 58. In this case, this also involves a sintered metal part 59 that is supported in a cover-associated holder 65. The part 59 is in contact with the outside climate through a groove 66 that ends in openings 67 at the edge of the cover. This allows air to move between the interior of the connection box 10 and the outer environment, thereby preventing any positive pressure, negative pressure, and in particular, the formation of condensation inside the box.

The base of such a connection box 10 that was previously utilized for the encapsulation technique can be easily used for encapsulation-free sealing by the above-described cover 30 of FIG. 9.

In sum, mounting circuit elements in the cover 30 or 50 advantageously significantly reduces the design-related and fabrication-related cost of fitting solar panels with the connection boxes 10. Circuit elements within the scope of the invention are defined as elements that inside the connection box 10 either have an effect on the transmission of electricity from the solar panel to the public electrical network, or affect the microclimate existing inside the connection box 10. Explicitly not circuit elements are the seals between the cover 30 or 50, and the base 11 of the connection box 10. These have no effect on the transmission of electricity and also have similarly little effect on the microclimate existing inside the connection box 10.

On the contrary, these types of seals are what create a microclimate existing inside the connection box 10

We claim:

1. A box for connecting an output conductor from a solar panel with a feed cable, the box comprising:
   a base mountable on the solar panel and formed with a first hole for the panel-output conductor and a second hole for the feed cable;
   a removable cover fittable with the base in a closed position and forming in the closed position with the base a substantially closed compartment; and at least one component mounted on the cover and connectable with the output conductor and the feed cable when the cover is fitted to the base.

2. The connection box defined in claim 1 wherein the component affects transmission of electricity from the solar panel through the box.

3. The connection box defined in claim 1 wherein the component affects a microclimate in the compartment.

4. The connection box defined in claim 1 wherein the component is a connector that electrically connects the panel-output cable to the feed cable.

5. The connection box defined in claim 1 wherein the component is a conductive strip, a lead frame, or a switching or control element.

6. The connection box defined in claim 5 wherein the component is a diode.

7. The connection box defined in claim 1 wherein the component is a heat-dissipating element or a gas-exchange element.

8. The connection box defined in claim 7 wherein the heat-dissipating element is a heat-sink plate.

9. The connection box defined in claim 8 wherein the plate has a thermal bridges engaging a heat-transmitting circuit elements in the compartment.

10. The connection box defined in claim 9 wherein the thermal bridges are spring tongues.

11. The connection box defined in claim 9 wherein the thermal bridges are unitary with the heat-sink plate.

12. The connection box defined in claim 7 wherein the gas-exchange element is a sintered-metal plug fitted in an opening through a wall of the box.

* * * * *